United States Patent
Sparacio et al.

[11] 3,728,722
[45] Apr. 17, 1973

[54] PROBABILITY DENSITY FUNCTION GENERATOR

[75] Inventors: Joseph F. Sparacio, Monroe, Conn.; Richard S. Pierro, Bronx, N.Y.

[73] Assignee: United Aircraft Corporation, Hartford, Conn.

[22] Filed: Oct. 22, 1971

[21] Appl. No.: 191,687

[52] U.S. Cl...................343/5, 343/5 SA, 328/147
[51] Int. Cl...............................................G01s 9/02
[58] Field of Search ................343/5 R, 5 SA, 5 PC, 343/11 R; 328/146, 148, 147; 307/235; 346/29

[56] References Cited

UNITED STATES PATENTS

| | | | |
|---|---|---|---|
| 3,039,024 | 6/1952 | Spooner | 328/146 X |
| 2,982,887 | 5/1961 | Seeley, Jr. | 328/146 X |
| 3,525,994 | 8/1970 | Dobson | 343/11 R |
| 3,638,227 | 1/1972 | Angel | 346/29 X |

Primary Examiner—Benjamin A. Borchelt
Assistant Examiner—A. M. Psitos
Attorney—Melvin P. Williams

[57] ABSTRACT

Apparatus for generating a curve of a probability density function of sampled voltage provides an averaged signal which is proportional to the average portion of time that the sampled voltage is within a predetermined increment of a voltage level within a range of interest. An X-Y recorder provides a curve of the averaged voltage for each level within the range of interest.

11 Claims, 2 Drawing Figures

3,728,722

PROBABILITY DENSITY FUNCTION GENERATOR

BACKGROUND OF THE INVENTION

1. Field of Invention

This invention relates to apparatus for generating a curve of a probability density function in response to sample inputs from a sample space, and more particularly to circuitry for the generation of curves of a probability density function of a sampled input.

2. Description of the Prior Art

In the prior art, the use of the term "probability density function" is the consequence of an analogy between continuous probability distributions and continuous mass distributions. For example, a structure such as a uniform rod has a finite mass and a mass per unit length but a very thin slice from a cross section may be thought of as being weightless. Furthermore, a weight attached to a point on the rod causes the mass per unit length at the point to be infinite. Analogously, the area under the curve of a probability density function in a range between two points of the curve's abscissa is representative of the probability of one of a range of events occurring, with the range of events being represented by the range of the abscissa between the two points. Furthermore, when the two points on the abscissa are very close together, the area under the curve between the two points is very small and the probability that is represented is very small. Associating a finite probability with a point on the abscissa is analogous to attaching the weight to a point on the rod in that the probability density is infinite at the point on the abscissa.

Properties of probability density functions, such as the mean and the variance, have traditionally been used to test hypotheses or draw inferences in a plethora of applications where a sampling of data is taken from a sample space. More recently, it has been observed that different types of radar targets may provide radar return signals each having a distinctive probability density function of amplitude. In the case of an airborne radar, a probability density function of the amplitude of a return signal is typically obtained by recording the signal on a magnetic tape and later processing the tape at a computer facility where the probability density function is computed and displayed in the form of a curve; on-line apparatus for rapid determination of probability density functions has not heretofore been available.

SUMMARY OF THE INVENTION

A object of the present invention is to provide on-line generation of probability density function curves.

According to the present invention, a signal is generated which is substantially proportional to the probability that the value of a sampled parameter falls within parameter values above and below a known parameter value.

In further accord with the present invention, a circuit provides an averaged signal which is proportional to an average portion of time that a sampled signal falls within an upper limit which is greater than a known signal and a lower limit which is less than the known signal.

The present invention provides apparatus for an on-line generation of curves of probability density functions in aircraft or at locations where a computer facility may not be readily available. In addition, the curves are generated in a simpler and more reliable manner than heretofore known in the prior art.

Other objects, features and advantages of the present invention will become more apparent in the light of the following detailed description of a preferred embodiment thereof as illustrated in the accompanying drawing.

DESCRIPTION OF THE PREFERRED EMBODIMENT

The invention generates a probability density function (called pdf, hereinafter), over a range of interest of the amplitude of a sampled parameter, such as a voltage. The principle of the invention is that the probability of a voltage being within an upper limit and a lower limit, with the limits having a particular median amplitude, is obtained by determining the average percentage of time that the voltage is within the limits. The probability is proportional to the value of the *pdf* of the particular median amplitude. The pdf generated by the invention is, in this embodiment, in the form of a curve wherein each ordinate is proportional to the average time that a sampled voltage is within the limits having a median amplitude (abscissa value) within the range of interest. The area under the curve is representative of the probability that the voltage being sampled is within the range of interest; this is an essential property of the *pdf*.

Figure 1:
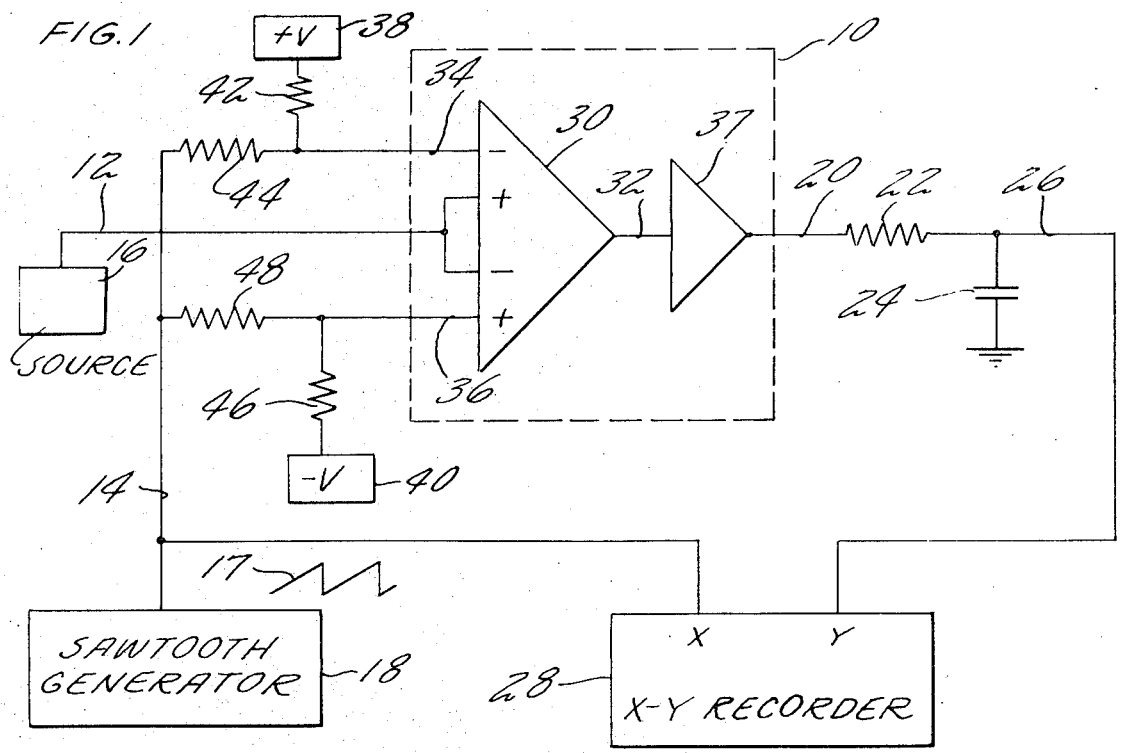
FIG. 1 is a schematic block diagram of a preferred embodiment of the present invention.

Referring now to FIG. 1, a *pdf* generator in accordance with the invention comprises a dual comparison means 10 which is concurrently responsive to voltages provided on a signal line 12 and on a signal line 14. A sampled voltage, whose *pdf* of amplitude is desired, is provided on the line 12 by a sampled parameter source such as a sampled voltage source 16, and a sawtooth voltage 17 is provided on the line 14 by a range parameter source such as a sawtooth generator 18. The comparison means 10 provides a detection signal level of R volts (which may, for instance, be 3.5 volts when the comparison means 10 is implemented with TTL logic elements) on a signal line 20 in response to the voltage on the line 12 being within an upper and a lower limit having a median value equal to the sawtooth voltage 17 on the line 14; under all other conditions the signal on the line 20 is at ground potential. The average of the detection signal on the line 20, as described hereinafter, is representative of the pdf of the input signal amplitude.

Because the median value of the limits of the comparison means 10 is equal to the instantaneous level of the sawtooth voltage 17, a sample space or range of signals for which a *pdf* is generated is substantially equal to the range of amplitudes of the sawtooth voltage provided on the line 14. The difference between the limits of the comparison means is very small compared to the range of the sawtooth voltage 17 so that as the sawtooth voltage 17 changes the median value of the limits, the different voltage amplitudes provided by the source 16 are readily resolved. The sweep of the sawtooth voltage 17 is sufficiently slow so that an amplitude of the sampled voltage within the limits is sampled often enough to provide a large sampling; a meaningful average of the detection signal is thereby provided. The length of time that an amplitude of the sawtooth voltage 17 is within the limits is referred to hereinafter as a sampling time. Typically, the range of the sawtooth voltage 17 is 10 volts peak to peak, the sweep time is 100 seconds, and the upper limit is 10 millivolts above the lower limit, thereby providing the sampling time of 100 milliseconds.

An averaging network consisting of a resistor 22 and a capacitor 24 averages the detection signal on the line 20 and provides on a signal line 26 an averaged signal substantially representative of the *pdf* of the input signal amplitude. The averaging is performed over an appropriate period of time because the time constant of the averaging network is small compared with the sampling time and sufficiently large to substantially filter out variations about the average value of the detection signal; the network will thereby resolve different amplitudes provided by the source 16 and provide an averaged signal in a substantially steady state condition.

A curve of the pdf, provided by a recorder 28, has an ordinate value proportional to the averaged signal on the line 26 provided to a Y input, and an abscissa value proportional to the sawtooth voltage 17 on the line 14, connected to an X input. The ordinate is scaled so that R volts represents a maximum value of the pdf; this is consistent with the maximum voltage of the averaged signal that may be obtained on the line 26.

Figure 2:
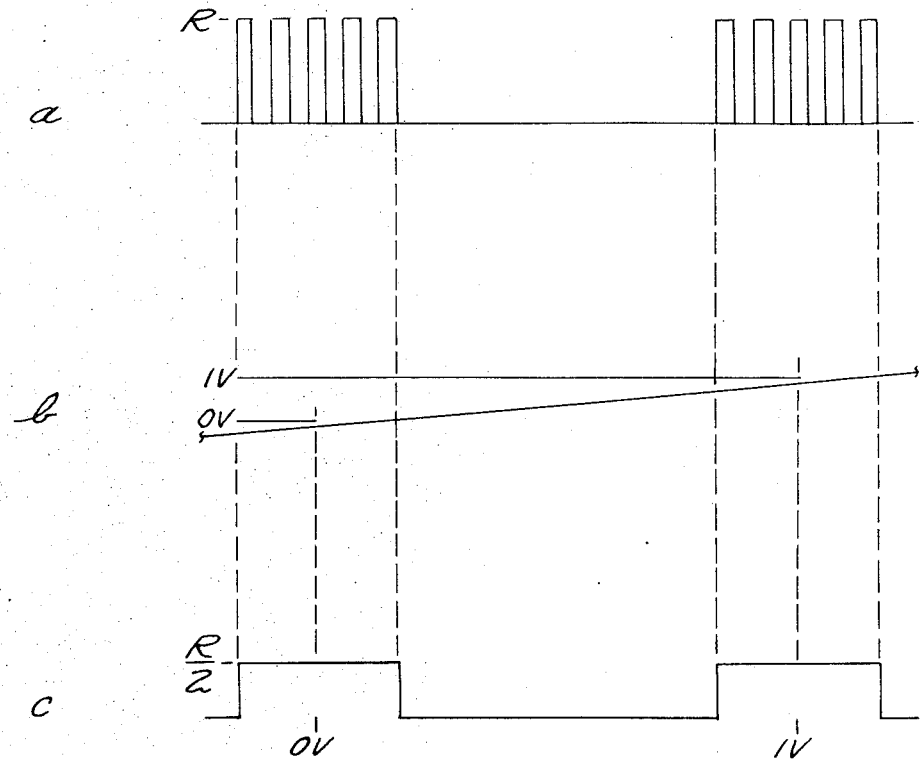
FIG. 2 is an illustration of the waveforms of a detection signal, a sawtooth signal and an averaged signal, all on a common time base.

As one example of the operation of the invention, a constant sampled voltage of zero volts on the line 12 causes an average signal level of R volts (maximum *pdf*) at abscissa values corresponding to limits having a median value of zero volts; the area under the rectangular curve provided by the recorder 28 is representative of a probability of unity. At all other abscissa values the average signal is zero volts ($pdf = 0$). This is in contrast with a second example where a sampled square wave voltage having a maximum amplitude of one volt and a minimum amplitude of zero volts causes averaged signals of R/2 volts (half maximum) at abscissa values corresponding to limits having median values of 0 volts and 1 volt. Accordingly, the area under each rectangular curve is representative of a probability of one-half. Referring to FIG. 2, waveforms relevant to the second example comprise the detection signal waveform on the line 20 (FIG. 2, illustration a), a portion of the sawtooth signal waveform on the line 14 (FIG. 2, illustration b) and the averaged signal waveform on the line 26 (FIG. 2, illustration c) juxtaposed to illustrate the timing of related elements of the example. Each waveform has the same time base.

The comparison means 10 (FIG. 1) is comprised of a dual comparator 30 which is well known in the art and commonly available as an integrated circuit component, such as Fairchild UA711. In this embodiment the dual comparator 30 provides a signal level of R volts on a signal line 32 in response to the voltage on the line 12 being more positive than a voltage on a signal line 34, or alternatively, more negative than a voltage on a signal line 36; all other voltages on the line 12 are within the limits and cause the comparator 30 to provide ground potential on the line 32.

A logic inverter 37 inverts the signal levels provided by a comparator 30 thereby causing the detector 10 to provide signal levels of R volts (when the sampled voltage is within the limits) and ground potential as described hereinbefore.

The voltage difference between the lines 34, 36 (difference between the limits) is determined by positive and negative voltages of equal magnitude provided by voltage supplies 38, 40 respectively, and two substantially identical voltage dividers; a positive voltage divider consists of resistor 42, 44 and a negative voltage divider consists of corresponding resistors 46, 48. The voltage on the line 34 is equal to a fraction of the voltage provided by the supply 38 added to a fraction of the voltage on the line 14. Similarly, the voltage on the line 36 is equal to a fraction of the voltage provided by the supply 40 added to a fraction of the voltage on the line 14. Since the same fraction of the voltage on the line 14 is added to the lines 34, 36, it does not affect the difference between the limits because it does not contribute to a voltage difference. The voltage on the line 14, does, however, add a common voltage to the lines 34, 36 thereby determining the voltage level of the median of the limits. The difference between the limits is equal to the sum of the fractions of the voltage of each of the supplies 38, 40 that comprise the voltages on the line 34, 36.

In the embodiment of the present invention, the source 16 may be an airborne radar apparatus which provides a voltage proportional to the amplitude of a radar target return signal. The invention thereby provides the target's "signature" in the form of the pdf of the amplitude of the target return signal.

Other embodiments of the present invention may includes other suitable range parameter sources such as a staircase waveform generator. Discrete points of the pdf are provided by an embodiment of this type, with each step of the staircase corresponding to a point. The time required for generating a point is the time duration of a step (sampling time).

It should be understood that other embodiments of the invention may include other suitable recorders, such as a high persistence cathode ray tube oscilloscope. It should be further understood that other embodiments may not include the X input to a recorder, such as in a "free running" recorder.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. In the method of generating a signal substantially representative of the probability density of a sampled parameter corresponding to a value of a known parameter within a range of interest, the steps of:

providing an upper limit signal representative of the value of an upper limit parameter greater than the value of the known parameter and a lower limit signal representative of the value of a lower limit parameter less than the value of the known parameter, the difference in value between said limit parameters being substantially smaller than the range of interest;

receiving a sampled signal representative of the value of the sampled parameter; and generating a probability density signal substantially proportional to the probability that said sampled signal falls between said lower limit signal and said upper limit signal.

2. The method according to claim 1 wherein the step of generating includes the steps of:

comparing said sampled signal with said limit signals; and providing an averaged signal representative of the average portion of a period of time during which the value of the sampled signal falls between the value of said lower limit signal and the value of said upper limit signal.

3. In the method according to claim 2, the additional steps of:

providing a time varying range signal representing the value of the known parameter; and recording an ordinate and an abscissa proportional to said averaged signal and said range signal, respectively.

4. Apparatus for generating a signal substantially representative of probability density of a sampled parameter corresponding to a value of a known parameter within a range of interest, said apparatus adapted for connection to a sampled parameter source which provides a sampled signal representing the value of the sampled parameter and adapted for connection to a range parameter source which provides a range signal representing the value of the known parameter, comprising:

limit parameter means adapted for connection and response to the range signal, for providing a upper limit signal representing value of an upper limit parameter greater than the known parameter value and a lower limit signal representing the value of a lower limit parameter less than the value of the known parameter, the difference in value between said limit parameters being substantially smaller than the range of interest; and means adapted for connection to the sampled parameter source and connected to said limit parameter mean for concurrent response to the sampled signal and said limit signals for providing a signal substantially representative of the average portion of time during which the value of the sampled parameter falls between the values of said limit parameters.

5. Apparatus for recording a signal substantially representative of a probability density of a sampled parameter corresponding to a value of a known parameter within a range of interest, comprising:

a sampled parameter source which provides a sampled signal representing the value of said sampled parameter;

a range parameter source which provides a range signal representing the value of said known parameter;

limit parameter means connected for response to said range signal for providing an upper limit signal representing the value of an upper limit parameter greater than the value of said known parameter and a lower limit signal representing the value of a lower limit parameter less than the value of said known parameter, the difference in value between said limit parameters being substantially smaller than said range of interest; and circuit means connected for concurrent response to said sampled signal and said limit signals for providing an averaged signal representative of the average portion of time during which the value of said sampled signal falls between the values of said limit signals.

6. Apparatus according to claim 5 wherein said circuit means comprises:

comparison means for providing a detection signal in response to the value of said sampled signal falling between the values of said limit signals; and means connected to said comparison means and responsive to said detection signal for providing said averaged signal as a function of the time average of said detection signal.

7. Apparatus according to claim 6 wherein the signals representing the values of the parameters are voltages and said comparison means comprises:

a dual comparator connected for concurrent response to the voltage representing said sampled signal and the voltages representing said limit signals for providing said detection signal.

8. Apparatus according to claim 5, additionally comprising a recorder connected for concurrent response to said averaged signal and said range signal for plotting one as a function of the other.

9. Apparatus according to claim 5 wherein said range parameter source provides a signal representing the value of said known parameter which varies within the range of interest as a function of time.

10. Apparatus according to claim 9 additionally comprising a recorder connected for concurrent response to said averaged signal and said range signal for providing the abscissas and the ordinates, respectively, of a curve of said probability density function.

11. Apparatus according to claim 9 for providing a signature of a radar target wherein said sampled parameter source is a radar apparatus and the value of said sampled parameter is the amplitude of a radar target return signal.

* * * * *